United States Patent
Adkins et al.

(10) Patent No.: US 9,218,235 B2
(45) Date of Patent: Dec. 22, 2015

(54) SYSTEMS AND METHODS OF VERIFYING OPERATIONAL INFORMATION ASSOCIATED WITH AN IMAGING DEVICE

(71) Applicant: Lexmark International, Inc., Lexington, KY (US)

(72) Inventors: Christopher Alan Adkins, Lexington, KY (US); Mark Leo Doerre, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 169 days.

(21) Appl. No.: 14/035,998

(22) Filed: Sep. 25, 2013

(65) Prior Publication Data

US 2015/0089295 A1 Mar. 26, 2015

(51) Int. Cl.
G06F 11/00 (2006.01)
G06F 11/07 (2006.01)
G06F 21/60 (2013.01)
G06F 21/62 (2013.01)

(52) U.S. Cl.
CPC ............ *G06F 11/079* (2013.01); *G06F 21/606* (2013.01); *G06F 21/608* (2013.01); *G06F 21/6209* (2013.01); *G06F 2221/2101* (2013.01)

(58) Field of Classification Search
CPC . G06F 11/0733; G06F 11/079; G06F 21/608; G06F 21/6209
See application file for complete search history.

(56) References Cited

U.S. PATENT DOCUMENTS

| | | | |
|---|---|---|---|
| 5,748,740 A | 5/1998 | Curry | |
| 6,511,142 B1 * | 1/2003 | Carmon et al. | 347/7 |
| 6,547,364 B2 | 4/2003 | Silverbrook | |
| 7,111,782 B2 | 9/2006 | Homewood | |
| 7,261,235 B2 | 8/2007 | Barenburg | |
| 7,346,655 B2 | 3/2008 | Donoho | |
| 7,441,712 B2 | 10/2008 | Silverbrook | |
| 7,461,778 B2 | 12/2008 | Silverbrook | |
| 7,581,826 B2 | 9/2009 | Silverbrook | |
| 7,784,681 B2 | 8/2010 | Silverbrook | |
| 7,808,610 B2 | 10/2010 | Silverbrook | |
| 8,016,400 B2 | 9/2011 | Silverbrook | |
| 8,020,979 B2 | 9/2011 | Silverbrook | |
| 8,096,466 B2 | 1/2012 | Silverbrook | |
| 8,587,798 B2 * | 11/2013 | Simpson et al. | 358/1.15 |
| 8,814,450 B2 * | 8/2014 | Yearworth et al. | 400/62 |
| 2001/0037462 A1 * | 11/2001 | Bengtson | 713/201 |
| 2003/0105963 A1 | 6/2003 | Slick | |
| 2004/0109567 A1 | 6/2004 | Yang | |
| 2004/0181681 A1 * | 9/2004 | Salisbury | 713/200 |
| 2005/0046876 A1 | 3/2005 | Burget | |
| 2006/0023249 A1 * | 2/2006 | Simpson | 358/1.15 |
| 2006/0072145 A1 * | 4/2006 | Simpson | 358/1.15 |
| 2006/0087678 A1 * | 4/2006 | Simpson | 358/1.15 |
| 2006/0157559 A1 | 7/2006 | Levy | |
| 2006/0279588 A1 * | 12/2006 | Yearworth et al. | 347/6 |
| 2007/0079125 A1 * | 4/2007 | Adkins et al. | 713/176 |
| 2007/0103715 A1 * | 5/2007 | Nakata | 358/1.14 |
| 2010/0138663 A1 | 6/2010 | Silverbrook | |

(Continued)

*Primary Examiner* — Joshua P Lottich

(57) ABSTRACT

The invention is directed to a method for performing failure analysis on an imaging device that includes retrieving an encrypted error log containing one or more error conditions that occurred on the imaging device, decrypting the retrieved encrypted error log, determining if the retrieved encrypted error log has been altered based on the decrypted error log, and upon determining that the retrieved encrypted error log has not been altered, performing failure analysis on the imaging device using the decrypted error log.

18 Claims, 3 Drawing Sheets

(56) References Cited

U.S. PATENT DOCUMENTS

| | | |
|---|---|---|
| 2011/0128567 A1* | 6/2011 | Cachia et al. ............. 358/1.14 |
| 2011/0138192 A1* | 6/2011 | Kocher et al. ............. 713/189 |
| 2011/0154043 A1* | 6/2011 | Lim et al. ............. 713/172 |
| 2011/0156914 A1 | 6/2011 | Sheharri |
| 2012/0111939 A1 | 5/2012 | Silverbrook |
| 2012/0317662 A1* | 12/2012 | Neo et al. ............. 726/34 |
| 2013/0070279 A1* | 3/2013 | Misumi ............. 358/1.14 |
| 2014/0164785 A1* | 6/2014 | Ochiai et al. ............. 713/189 |
| 2014/0270813 A1* | 9/2014 | Ignatchenko et al. ............. 399/12 |
| 2014/0270814 A1* | 9/2014 | Ignatchenko et al. ............. 399/12 |
| 2015/0191007 A1* | 7/2015 | Anderson et al. ............. 347/19 |

* cited by examiner

ность and completeness of the information relating to
SYSTEMS AND METHODS OF VERIFYING OPERATIONAL INFORMATION ASSOCIATED WITH AN IMAGING DEVICE

FIELD OF THE INVENTION

The present invention relates to encrypting printer information. More particularly, it relates to systems and methods of verifying printer information for use in validating warranty claims and diagnosing imaging device failures.

BACKGROUND

Conventionally, technical support is provided to a customer that requires troubleshooting of one or more imaging device errors. Technical support may be provided by a technician sent to the field to personally check, diagnose and/or fix the problematic imaging device, or by a technical support agent contacted by the customer to remotely perform a troubleshooting sequence to resolve the problem or at least identify the cause of the problem. To accurately diagnose the imaging device failures, support technicians typically require a complete and accurate view of how the customer's printer was used. Important events in the printer, such as error conditions, are also helpful in allowing support technicians to diagnose imaging device failures.

Accurate and complete information of the imaging device is also needed to verify warranty claims posted by a customer. If the imaging device was operated by a user outside of designed parameters such as, for example, when the user installs counterfeit cartridges, the user may be responsible for damages on the imaging device instead of the manufacturer, and warranty conditions may not apply. Counterfeit print cartridges are third-party cartridge products that are not made by the original equipment manufacturer (OEM) and have not been subject to stringent OEM quality control standards. As such, the use of counterfeit cartridges may degrade the performance and cause failures of the imaging device.

Warranty conditions also typically define product mistreatment that voids a warranty claim. When a customer uses the imaging device outside of the designed operation parameters that would fall under product mistreatment, warranty conditions may not apply.

In such cases wherein users knowingly bypass the terms and conditions of the printer use, the user may be motivated to suppress or alter the history of print cartridge use in the imaging device. Users may also unintentionally cause alteration or deletion of the information which can prevent technical support from giving accurate failure diagnosis of the printer for troubleshooting purposes.

Accordingly, a need exists in the art to secure information relating to operations performed in the printer and cartridge use that is tamper-evident such that an act of altering or deleting the information causes an indication that a breach has occurred. What is also needed is a method of verifying accuracy and completeness of the information relating to operations performed by imaging device and print cartridges installed in the imaging device. Additional benefits and alternatives are also sought when devising solutions.

SUMMARY

The above-mentioned and other problems are solved by tamper-evident systems and methods of encrypting data relating to one or more print cartridges installed in an imaging device, in a representative embodiment, the method may include a trusted subsystem of the imaging device triggering a gathering of data relating to one or more print cartridges installed in the imaging device, recording a number of instances the triggering is performed, retrieving a previously encrypted data relating to the one or more print cartridges installed in the imaging device, the previously encrypted data gathered at a time prior to the triggering and encrypting the gathered data using the previously encrypted data.

In an alternative example embodiment, a controller of an imaging device gather data relating to one or more operations performed by the imaging device from a first operation of the imaging device up to a time the data is gathered, retrieves a previously encrypted data the previously encrypted data corresponding to encrypted data relating to one or more operations performed by the imaging device, and encrypts the gathered data using the previously encrypted data. A non-volatile memory in imaging device stored the encrypted gathered data, a one-time programmable (OTP) memory may record the instance of the gathering of the data by the controller through a bit set in the OTP memory for every instance of the controller gathering the data.

In another alternative example embodiment, a tamper-evident method for securing an error log of an imaging device may include gathering an accumulated error log relating to one or more error conditions of the imaging device accumulated from a first operation of the imaging device up to a time of the gathering, retrieving a stored encrypted error log corresponding to an error log encrypted prior to the time of the gathering, keeping count of a number of instances the gathering is performed by permanently setting a bit in a memory of the imaging device and encrypting the accumulated error log using the previously encrypted error log.

These and other example embodiments are set forth in the description below. Their advantages and features will become readily apparent to skilled artisans. The claims set forth particular limitations.

BRIEF DESCRIPTION OF THE DRAWING

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description, reference is made to the accompanying drawings where like numerals represent like details. The embodiments are described in sufficient detail to enable those skilled in the art to practice the invention. It is to be understood that other embodiments may be utilized and that process, electrical, and mechanical changes, etc., may be made without departing from the scope of the invention. The following detailed description, therefore, is not to be taken in a limiting sense and the scope of the invention is defined only by the appended claims and their equivalents. In accordance with the features of the invention, tamper-evident methods are described for securing information relating to operations performed by an imaging device, and/or information relating to imaging cartridges for use in diagnosing imaging device failures and validating warranty claims.

Figure 1:
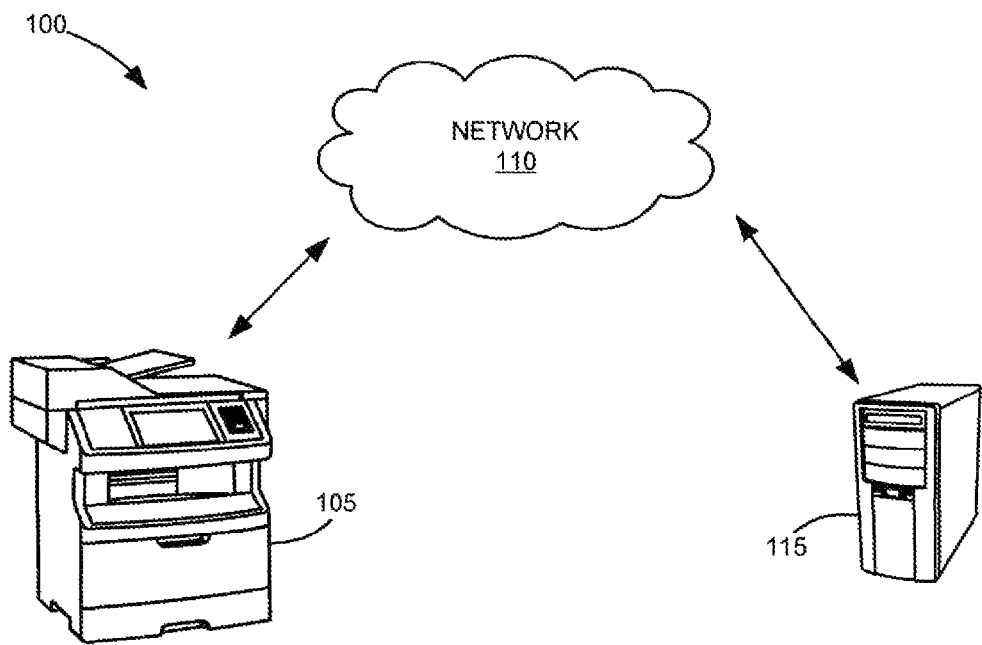
FIG. 1 is a diagrammatic view of a system in accordance with the present invention showing an imaging device, a network and a trusted server.

With reference to FIG. 1, there is shown a system 100 including an imaging device 105, a network 110 and a trusted server 115. Imaging device 105 is communicatively connected to trusted server 115 through network 110.

Imaging device 105 may be any device capable of printing or producing a hard copy data file or document stored in electronic form, such as a laser, inkjet printer or multi-function printing device that has the capability of performing other functions such as faxing, e-mailing, scanning and/or copying, in addition to printing.

Figure 2:
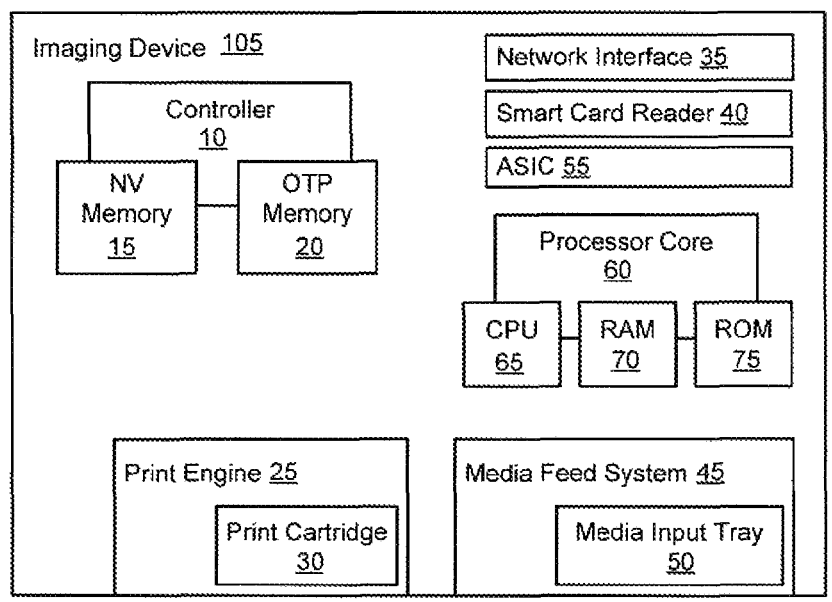
FIG. 2 is a block diagram of an imaging device.

With reference to FIG. 2, imaging device 105 includes one or more components such as, for example, a controller 10, a non-volatile (NV) memory 15, a one-time programmable (OTP) memory 20, a print engine 25, one or more print cartridges 30, a network interface 35, smart card reader 40, media feed system 45, media input tray 50, and one or more other application-specific integrated circuits (ASICs) 55, as will be known in the art. Each of these components may include unique identifying information. The unique identifying information refers to identifiers that establish an identity of each of the component that may be used to reference the component. Examples of unique identifying information includes ASIC die ID, serial number of ASIC 55, a flash storage serial number, imaging device firmware version number, a network media access control (MAC) address for imaging device 105, serial number of a smart card in imaging device 105, serial numbers of one or more print cartridges 30 used in imaging device 105, among many other identifiers of imaging device components as will be known by skilled artisans.

Imaging device 105 further includes a subsystem assigned with the highest level of trust. This subsystem secures and verifies information relating to imaging device 105 operations and one or more print cartridges 30 used in print engine 25, and other information relating to imaging device 105. The subsystem with highest level of trust may be referred herein as the trusted security subsystem (TSS). In one example embodiment, the TSS may be controller 10 in imaging device 105 configured to enforce a security policy for the imaging device 105 such as collecting sensitive and classified information relating to print cartridges 30 used in imaging device 105 and/or operations performed by imaging device 105.

The TSS may also perform cryptographic operations such as encryption by utilizing a variety of encryption algorithms known in the art. For example, an asymmetrical system such as an RSA encryption algorithm that uses public and private keys may be used. In an alternative example embodiment, a symmetrical algorithm such as the Advanced Encryption Standard (AES) may be also used to encrypt the imaging device information. Encrypting imaging device information protects the confidentiality of imaging device 105. Other techniques may also be used by TSS to protect the authenticity and integrity of the operational history such as, for example, creating a digital signature associated with the information. In an alternative embodiment, the TSS may be ASIC 55, a processor, or any other computing device of imaging device 105. The TSS of imaging device 105 may change from system to system depending on the architecture of imaging device 105.

In one example embodiment, TSS may be a dedicated hardware block within ASIC 55 of imaging device 105. The dedicated hardware block may include a dedicated memory such as NV memory 15 for storing cryptographic functions and cryptographic keys for use in performing security operations on imaging device 105.

In another alternative example embodiment, the TSS in the imaging device 105 may be a dedicated security processor core 60. Dedicated security processor core 60 may include a central processing unit (CPU) 65, a private random access memory (RAM) 70 and read-only memory (ROM) 75. The security processor core may store the cryptographic functions and keys within the private RAM 70 and/or ROM 75, or in NV memory 15.

In another alternative example embodiment, the TSS may be internal to ASIC 55 of imaging device 105 and may be the main CPU of imaging device 105. In this example embodiment, cryptographic functions may be stored in a code flash storage embedded in imaging device 105 and may be implemented in code by the main CPU. Cryptographic keys for use in performing the security operations may also be stored in the code flash storage or in ROM internal to the main ASIC.

In yet another alternative example embodiment, an external security system may perform the role of TSS for imaging device 105. The external security system may be a dedicated security ASIC such as, for example, a smart card to be read by smart card reader 40. The smart card may be an integrated circuit card having embedded integrated circuits that perform one or more operations for securing the information relating to imaging device operations and/or information relating to print cartridges used in imaging device 105.

In another alternative example embodiment, the TSS may be trusted server 115 as shown in FIG. 1, communicatively connected with imaging device 105 to perform security operations for imaging device 105. Logical connections between imaging device 105 and trusted server 115 may include a local area network (LAN) and/or a wide area network (WAN) that is presented herein by way of example and is not a limitation. In this example embodiment, trusted server 115 may perform security operations of operational history relating to imaging device 105. The operational history and secure operational history may be stored in NV memory 15 of imaging device 105. Alternatively, operational history may also be stored in a trusted database connected to at least one of imaging device 105 and trusted server 115.

Operational history refers to information relating to operations performed by imaging device 105 gathered and secured by the TSS of imaging device 105. Operational history may also refer to information relating to one or more components of imaging device 105 used to perform imaging device operations such as printing and scanning. Operational history may be information accumulated from a first operation of imaging device 105 up to a time the operational history is gathered. Examples of operational history to be gathered and secured by the TSS of imaging device 105 include, but are not limited to, total pages printed gathered from media feed system 45, total pages printed for each paper type used in imaging device 105, total printer consumables used, total consumables of each type, error conditions in imaging device 105 such as an error log, history of all print cartridges 30 used in imaging device 105 (includes third party print cartridges), history of temperature and humidity readings, if sensors are available in imaging device 105. Operational history may also include logged printer events such as, spooler error events, and other information that corresponds to one or more components of imaging device 105.

With continued reference to FIG. 1, network 110 is any network, communications network, or network/communications network system such as, but not limited to, a peer-topeer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing. Imaging device 105 may be configured to communicate with trusted server 115 through network 110.

Trusted server 115 may be a remote computer that performs cryptographic operations of imaging device operational history. The operational history and an encrypted operational history, such as for example a signature, may be generated by trusted server 115 and may be stored in the NV memory 15 of imaging device 105. Alternatively, the encrypted operational history may also be stored in a trusted storage device communicatively connected with at least one of imaging device 105 and trusted server 115.

Figure 3:
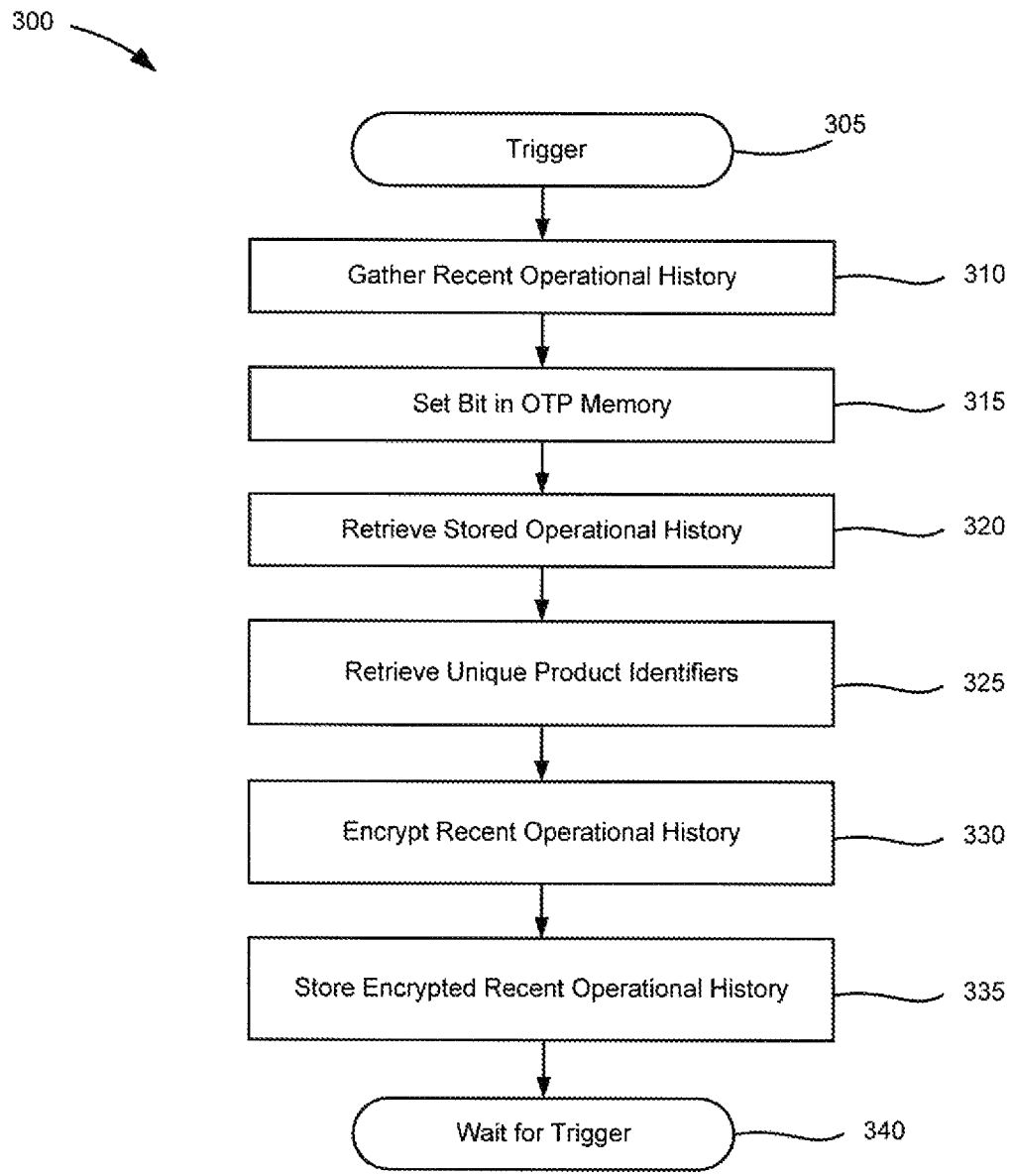
FIG. 3 is a flowchart in accordance with the present invention illustrating an example embodiment of a tamper-evident method of securing information relating to the imaging device.

FIG. 3 shows an example method 300 of securing operational history of imaging device 105 by the TSS as a component of imaging device 105. In an alternative example embodiment, method 300 may be performed remotely by trusted server 115 with data gathered and transmitted to and from imaging device 105 and trusted server 115 using communication links known in the art.

At a time of a trigger point (at block 305), TSS gathers the most recent operational history (at block 310). The most recent operational history refers to information relating to operations performed by imaging device 105 from a first time the imaging device 105 was used up to a time of the triggering. As aforementioned, operational history may include some or all of the following example imaging device information: total pages printed, total pages of each paper type, accumulated history of error conditions (e.g. error log), history of temperature and humidity, among many other imaging device information as will be known in the art.

In an alternative embodiment, the most recent operational history may also refer to print cartridge information from a first time imaging device 105 was used up to a time of the triggering. The print cartridge information may be data related to one or more print cartridges used in imaging device 105 such as, for example, serial number of the print cartridge, time of installation or uninstallation of the print cartridge, and other information as will be known by skilled artisans of the art. With reference to FIG. 3, operational history may be used to refer to information relating to either or both operations performed by imaging device 105 and print cartridge information used in imaging device 105.

The trigger point may occur at a pre-defined time or time interval and may be based on a reading from a real-time clock (not shown) in imaging device 105. Additionally, the trigger point may also be based one or more operations occurring on imaging device 105. For example, the triggering of the gathering may occur on an installation or uninstallation of a supply item in imaging device 105, or when an error condition occurs in imaging device 105. Other operations of imaging device 105 may be used as a trigger point for gathering the operational history as will be known.

At block 315, a bit in a predefined array of OTP memory 20 is set each time the gathering of the operational history is performed. The setting of the bit in OTP memory 20 is locked by either a fuse or an anti-fuse thereby permanently recording an instance of the gathering in the OTP memory 20. The value of the OTP array (e.g. the number of bits set in OTP memory 20) may later compared to the number of operational history files stored in NV memory 15, thereby providing a trusted means of determining the expected number of operational history stored in NV memory 15 of imaging device 105.

At block 320, a stored operational history is retrieved by the TSS from NV memory 15 of imaging device 105. The stored operational history is operational history gathered at a previous trigger point, encrypted and stored in the NV memory 15 for later retrieval. The previously gathered operational history may refer to information relating to operations performed by imaging device 105 from the first time the imaging device 105 was powered on up to the time of the triggering.

At block 325, one or more unique product identifiers are retrieved. Unique product identifiers may refer to unique identifying information of imaging device 105 or components of imaging device 105. In order to ensure integrity of the operational history, the retrieved unique product identifiers are cryptographically bound to the operational history as one or more operations of imaging device 105 occur. Identification information of imaging device 105 that is retrieved include but are not limited to ASIC serial number, a flash storage serial number, imaging device firmware version number, a network media access control (MAC) address of imaging device 105, serial number of a smart card in imaging device 105, serial numbers of one or more print cartridges 30 used in imaging device 105, and many others.

At block 330, the recent operational history is encrypted to protect the accuracy and integrity of the operational history. Encrypting the recent operational history encodes the operational history such that only authorized parties can read the operational history, using one or more decryption algorithms. The encryption is also performed such that tampering of the operational history may be detected by an authorized party upon decryption of the operational history.

Encrypting the recent operational history may include generating a cryptographic tag and attaching the tag to a data record consisting of either a hash based message authentication code (HMAC) or a cryptographic signature. The cryptographic tag is generated using a combination of the previously stored operational history, at least one unique product identifier previously retrieved and a unique record identifier. The unique record identifier may be identifying information that refers to a data record corresponding to the recent operational history. For example, the unique record identifier for the gathered recent operational history may be a timestamp from the real-time clock of imaging device 105 from a time the recent operational history was gathered.

In an alternative embodiment, a digital value of the bit set at block 315 may also be used to generate the cryptographic tag alone or in combination with the previously stored operational history, the at least one unique product identifier and the unique record identifier.

Generating the cryptographic tag may use a cryptographic algorithm such as HMAC, PKI or hash to generate the tag as a function of at least one of the previously stored operational history, the at least one unique product identifier, the unique record identifier and the digital value of the set bit. It will be understood that HMAC, PKI and hash encryption algorithms are used for illustrative purposes and other algorithms may be used to generate the cryptographic tag and encrypt the operational history using the combination of the previously stored operational history, the at least one unique product identifier previously retrieved, the unique record identifier and the digital value of the set bit.

At block 335, the encrypted operational history is stored in NV memory 15 of imaging device 105. In an alternative embodiment, the encrypted operational history may be stored in storage medium of trusted server 115 such as, for example, a database.

At block 340, the TSS waits for a subsequent trigger point which indicates another instance of performing method 300. For example, the subsequent trigger point may be an installation of a new print cartridge on coupled to print engine 25 of imaging device 105. The installation triggers the TSS to gather recent operational history such as, for example, the serial number of the newly-installed print cartridge, the date and time of the installation, set a bit in OTP memory 20 to record the instance of the gathering, retrieve a previously stored operational history and unique product identifiers that is used to encrypt the recently gathered operational history and store the encrypted recent operational history.

Figure 4:
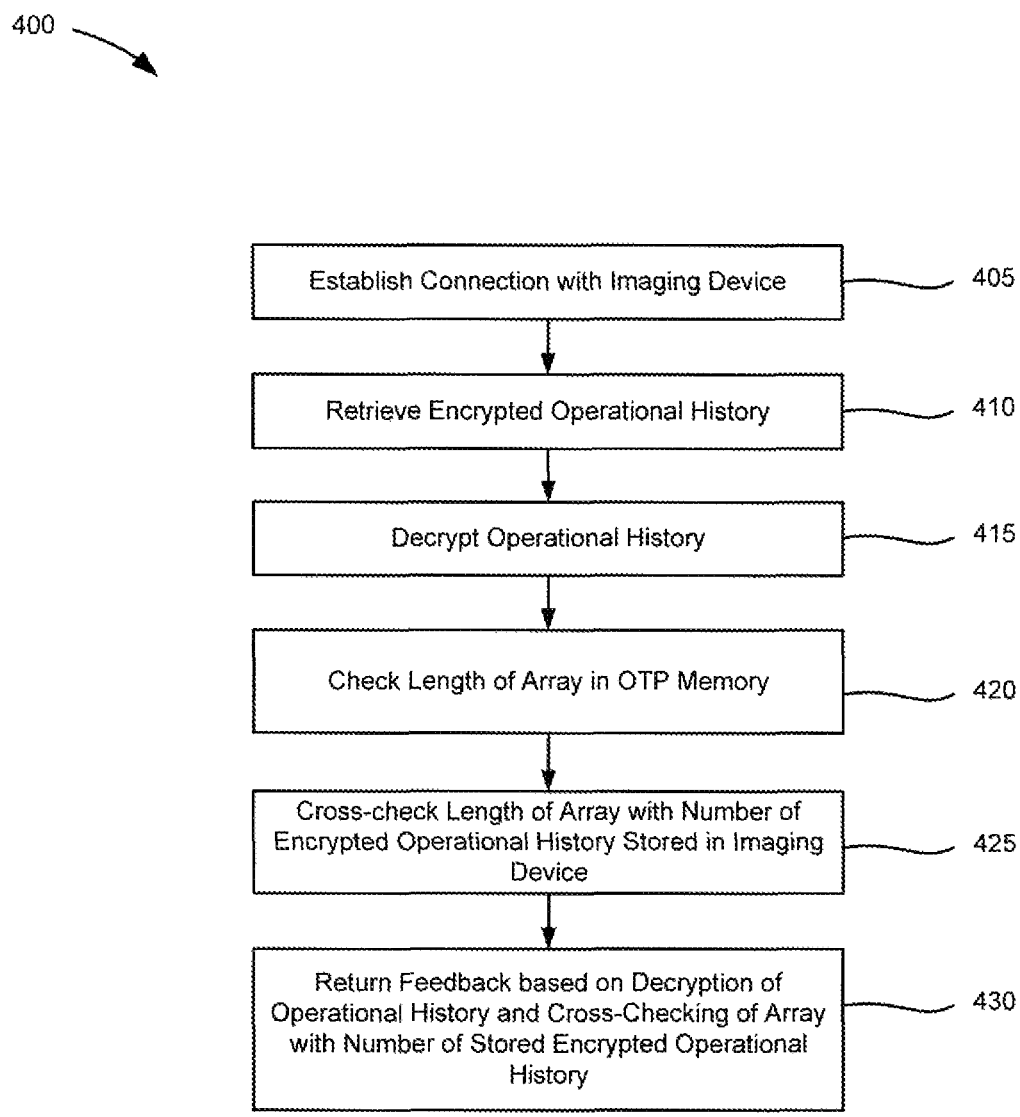
FIG. 4 is a flowchart in accordance with the present invention illustrating an example embodiment of verifying encrypted information relating to the imaging device.

FIG. 4 is an example method 400 of verifying an encrypted operational history to determine accuracy and integrity of the operational history. Method 400 may be performed by a technical support representative operating on a computing device connected with imaging device 105. In an alternative embodiment, method 400 may be performed by a technical support representative who may have physical contact with imaging device 105 (e.g. field technician). The field technician may utilize a special interface device such as, for example, a laptop, for verifying operational history of imaging device 105. For illustrative purposes, technical support may be used to refer to any party that verifies the encrypted operational history using method 400.

At block 405, connection is established with imaging device 105. The connection may be established through network 110 or using the special interface device for physically connecting with imaging device 105.

At block 410, an encrypted operational history file is retrieved. Retrieving the encrypted operational history file may include interrogating imaging device 105 with the most recently stored encrypted operational history file in NV memory 15 of imaging device 105. In an alternative example embodiment, retrieving the encrypted operational history file may include querying for the encrypted operational history file from a database connected with imaging device 105 such as, for example, a database in trusted server 115.

The encrypted operational history file to be retrieved may be the most recently encrypted and stored operational history in memory 15. Retrieving the most recently stored operational history file allows technical support to read the latest and presumably, the most exhaustive operational history from the first time imaging device 105 was used up to the time the operational history was encrypted and stored.

At block 415, the retrieved operational history file is decrypted. Decrypting the retrieved operational history file may include decoding the data that has been encrypted by utilizing a secret decryption key or password that unauthorized parties have no access to but technical support is authorized to use. The decryption algorithm to be used depends on the type of algorithm that was used to encrypt the operational history.

Decrypting the retrieved operational history file allows technical support to check if the operational history of imaging device 105 has been tampered such as, for example, an unauthorized user modifying the contents of the operational history file by changing or deleting content. For illustrative purposes, the retrieved operational history file was signed using a digital signature. If the operational history file is subsequently modified in any way, a verification of the signature will fail. In another alternative example embodiment, if the retrieved operational history file was encrypted with a cryptographic function, a hash value of the data file is computed and added to the operational history file. During decryption, the hash value of the encrypted operational history data file is re-computed to verify it the hash value has not changed after the encryption. If the decryption identifies that the hash values do not match, the decryption is not successful which indicates that the operational history file has been tampered with.

At block 420, a length of array in OTP memory 20 of imaging device 105 is checked to determine the number of operational history files expected to be stored in memory 15 of imaging device 105. The length of the array refers to the number of bits permanently set in OTP memory 20 every time operational history is gathered, and then encrypted and stored in imaging device 105. The length of the array is therefore a reliable indication of the completeness and accuracy of the stored operational history of imaging device 105.

The length of the array is then cross-checked with the actual number of encrypted operational history files stored (at block 425) to determine whether at least one operational history file in memory 15 has been deleted. If the length of the array is equal to the number of operational history files stored, none of the operational history files gathered and stored in imaging device 105 has been deleted. However, if the length of the array is not equal to the number of operational history files stored, at least one of the operational history files gathered and stored in imaging device 105 may have been intentionally or unintentionally deleted. For example, the length of the array is identified to be at 20 bits which indicates an expected 20 operational history files gathered and stored in NV memory 15 of imaging device. If there are 20 operational history files stored in NV memory 15 which matches the 20 bits array length, none of the operational history files gathered and stored has been deleted. However, if there are less than 20 operational history files stored in NV memory 15 which does not match the 20 bits array length, some of the operational history files stored is determined to have been deleted.

At block 430, a feedback is generated indicating whether or not at least one operational history file has been deleted or if the retrieved operational history file has been altered based on the decrypted operational history file. In one example embodiment, an error message is generated upon determining that the retrieved operational history file has been altered and/or if the length of the array is not equal to the number of stored operational history files, indicating a deletion of a file in NV memory 15. Another message may be generated and displayed in an interface of imaging device 105 to inform technical support that operational history stored in memory 15 of imaging device is accurate and complete.

If method 400 returns a positive indication of the accuracy, integrity and completeness of the operational history of imaging device 105, technical support may use the decrypted operational history to perform failure diagnosis of imaging device 105. For example, the decrypted operational history may be an error log detailing a history of error conditions in imaging device 105 and technical support may use the error log to troubleshoot imaging device 105.

Technical support may also use decrypted operational history to validate warranty claims. For example, the decrypted operational history may be accumulated information regarding how imaging device 105 was used over a period of time. Technical support may then read the decrypted operational history to see if imaging device 105 has been used outside of the designed operational parameters such that the user of imaging device is responsible for damages made to imaging device 105 rather than the manufacturer.

The decrypted operational history may also contain accumulated information relating to print cartridges installed in imaging device 105 such as, for example, serial numbers corresponding to previously installed print cartridges. Technical support may read the decrypted operational history to determine if at least one serial number corresponds to a counterfeit print cartridge, which allows technical support to verify if warranty claims of the user is valid. Other possible uses of the decrypted operational history will be known by skilled artisans of the art.

The foregoing illustrates various aspects of the invention. It is not intended to be exhaustive. Rather, it is chosen to provide the best illustration of the principles of the invention and its practical application to enable one of ordinary skill in the art to utilize the invention, including its various modifications that naturally follow. All modifications and variations are contemplated within the scope of the invention as determined by the appended claims. Relatively apparent modifications include combining one or more features of various embodiments with features of other embodiments.

The invention claimed is:

1. A method for performing failure analysis on an imaging device, comprising:
    retrieving an encrypted error log containing one or more error conditions that occurred on the imaging device;
    decrypting the retrieved encrypted error log;
    determining if the retrieved encrypted error log has been altered based on the decrypted error log; and
    upon determining that the retrieved encrypted error log has not been altered, performing failure analysis on the imaging device using the decrypted error log.

2. The method of claim 1, wherein the retrieving the encrypted error log includes retrieving a most recently encrypted error log from a plurality of stored encrypted error logs.

3. The method of claim 2, further comprising retrieving a number of instances a plurality of error logs is gathered by the imaging device.

4. The method of claim 3, further comprising determining that none of the plurality of stored encrypted error logs has been deleted if the number of instances the plurality of error logs is gathered matches a number of the plurality of stored encrypted error logs.

5. The method of claim 1, further comprising generating an error message upon determining that the retrieved encrypted error log has been altered.

6. The method of claim 1, wherein the retrieving the encrypted error log includes interrogating the imaging device for the encrypted error log.

7. The method of claim 1, wherein the retrieving the encrypted error log includes retrieving the encrypted error log from a trusted server communicatively connected to the imaging device.

8. A method for determining user tampering relating to one or more print cartridges installed in an imaging device, comprising:
    retrieving an encrypted print cartridge data from a plurality of stored encrypted data relating to the one or more print cartridges installed in the imaging device;
    determining if the retrieved encrypted print cartridge data has been altered by decrypting the retrieved encrypted print cartridge data;
    determining if at least one of the plurality of stored encrypted data has been deleted by matching a number of instances the plurality of stored encrypted data was gathered to a number of the plurality of stored encrypted data; and
    upon determining that the retrieved encrypted print cartridge data has not been altered, and that none of the plurality of stored encrypted data has been deleted, determining that the encrypted print cartridge data has not been tampered.

9. The method of claim 8, wherein the matching the number of instances the plurality of encrypted data was encrypted to the number of the plurality of stored encrypted data includes matching a number of permanently set bits corresponding to the instances the plurality of encrypted data was gathered to the number of the plurality of stored encrypted data.

10. The method of claim 8, further comprising generating an error message upon determining that the retrieved encrypted print cartridge data has been altered.

11. The method of claim 8, further comprising generating an error message upon determining that at least one of the plurality of stored encrypted data has been deleted.

12. The method of claim 8, wherein the retrieving the encrypted print cartridge data from the plurality of stored encrypted data includes retrieving a most recently stored encrypted print cartridge data from the plurality of stored encrypted data.

13. The method of claim 8, wherein the retrieving the encrypted print cartridge includes interrogating the imaging device for the encrypted print cartridge data.

14. A method for validating a warranty claim on an imaging device, comprising:
    interrogating the imaging device for an encrypted data file containing one or more serial numbers of one or more print cartridges installed in the imaging device;
    retrieving the encrypted data file;
    determining if the retrieved encrypted data file has been altered by decrypting the retrieved encrypted data file;
    determining if at least one of the serial numbers contained in the encrypted data file corresponds to a counterfeit print cartridge; and
    upon determining that the retrieved encrypted data file has not been altered and if none of the serial numbers contained in the encrypted data file corresponds to a counterfeit print cartridge, validating the warranty claim.

15. The method of claim 14, wherein the retrieving the encrypted data file includes retrieving a most recently encrypted data file from a plurality of stored data files, each data file containing one or more serial numbers of one or more print cartridges installed in the imaging device.

16. The method of claim 15, further comprising retrieving a number of bits corresponding to a number of instances the imaging device gathered the plurality of stored encrypted data files.

17. The method of claim 16, further comprising determining that none of the plurality of stored data files has been deleted if the number of bits matches a number of the plurality of stored encrypted data files.

18. The method of claim 14, further comprising generating an error message upon determining that the retrieved encrypted data file has been altered.

* * * * *